Figures 1, 2:
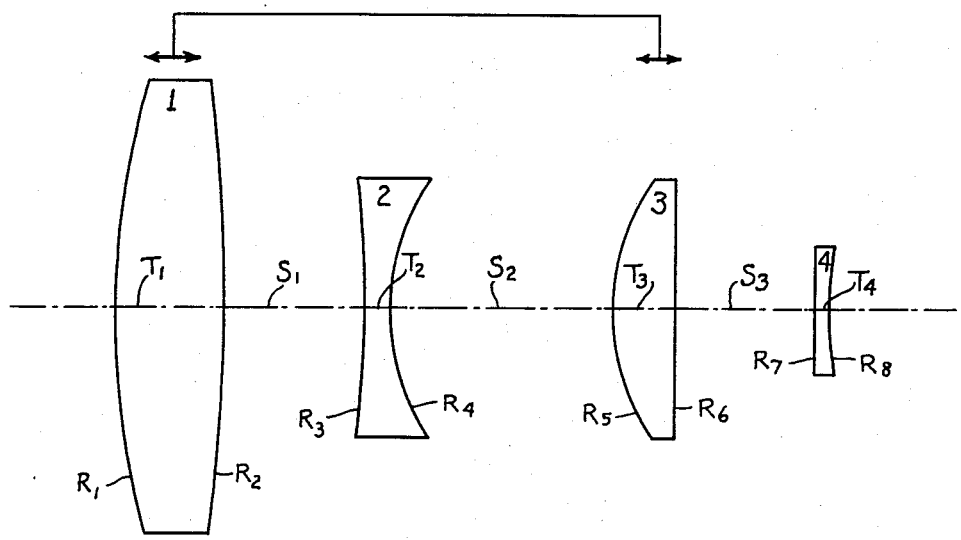

Aug. 29, 1961

G. B. LYNCH ET AL 2,997,921

LENS FOR ZOOM VIEWFINDERS

Filed Oct. 7, 1959

| Lens | Radii, mm. | Thicknesses, mm. |
|---|---|---|
| 1 | $R_1 = + 64.6$ | $T_1 = 8.67$ |
|   | $R_2 = -175.65$ | $S_1$ varies, 2.35 to 27.50 |
| 2 | $R_3 = - 80.6$ | $T_2 = 1.5$ |
|   | $R_4 = + 17.85$ | $S_2 = 28.65 - S_1$ |
| 3 | $R_5 = + 17.4$ | $T_3 = 4.6$ |
|   | $R_6 = \infty$ | $S_3 = S_1$ |
| 4 | $R_7 = \infty$ | $T_4 = 1.0$ |
|   | $R_8 = + 31.3$ | |
| All of molded plastic, $N_D = 1.49$ to 1.50, $V = 60.0$ to 61.0 | | |

2,997,921
LENS FOR ZOOM VIEWFINDERS

Geraldine B. Lynch, David C. Gilkeson, and Eugene Turula, Rochester, N.Y., assignors, by mesne assignments, to Revere Camera Company (formerly Samica Corporation), a corporation of Delaware
Filed Oct. 7, 1959, Ser. No. 845,012
2 Claims. (Cl. 88—57)

The present invention relates to a photographic camera (whether still or motion picture) having a picture-taking lens of variable focal length and magnification power, often called a zoom lens. When such a lens is adjusted to various positions (e.g., normal position, or wide angle position, or telephoto position) the size of the field of view is altered.

If the camera is of the single lens reflex type, the field of view as seen in the viewfinder is the same as the field of view of the picture-taking lens. But in other types of cameras, where the viewfinder does not employ the picture-taking lens, it has been necessary to resort to special arrangements, such as masking frames, or a series of markings on a reticle, to enable the user to determine exactly what field of view in the viewfinder corresponds to the field of view of the taking lens under any particular position of adjustment of the latter. This has often been awkward and confusing to the user.

An object of the present invention is the provision of an improved zoom lens of such simple and inexpensive construction that it can be used as an optical system for a viewfinder without unduly increasing the cost or complexity of the camera, thereby enabling the viewfinder lens to perform zoom movements along with the zoom movements of the taking lens, to match the field of view of the viewfinder to the variable field of view of the taking lens.

Another object is the provision of a zoom viewfinder in which the movable parts, during adjustment, perform the same movements to the same extent as those of the taking lens, thus enabling the movable parts of the viewfinder lens to be directly coupled to the movable parts of the taking lens, to move therewith.

Still another object is the provision of a viewfinder lens which is continuously adjustable over its entire range from maximum to minimum or vice versa, and which provides a corresponding continuously variable field of view, so that the viewfinder lens (like the picture-taking lens of the camera) may be used at any desired intermediate position and does not have to be set at one or another of a few predetermined positions.

A further object is the provision of a zoom viewfinder so designed that the lenses can be made of molded plastic material.

These and other desirable objects may be attained in the manner disclosed as an illustrative embodiment of the invention in the following description and in the accompanying drawings forming a part hereof, in which:

FIG. 1 is a diagrammatic view of a viewfinder lens in accordance with a preferred embodiment of the present invention; and FIG. 2 is a table of numerical data with respect to one specific embodiment of such a lens.

The same reference numerals throughout the several views indicate the same parts.

In order to have the zoom viewfinder indicate a field of view corresponding to that of the zoom picture-taking lens, the optical characteristics of the viewfinder lens should, of course, be matched to those of the taking lens. Merely for the sake of a specific example of a zoom taking lens, reference may be made to the lens disclosed in the copending United States patent application of Eugene Turula and Geraldine B. Lynch, Serial No. 786,978, filed January 15, 1959 (now Patent 2,925,010, granted February 16, 1960). The lens of that application comprises four main members (although some of them may be compound lenses made of two components), air spaced from each other, the first and third lenses, counting from the front, being positive or converging lenses, and the second and fourth members being negative or diverging lenses. The second and fourth lenses are stationary; the first and third are axially movable, but fixed relative to each other so that they move simultaneously and equally, during the zoom adjustment. As explained in the copending application, when the first and third lenses are in their extreme forward position, with the front face of the third lens close to the rear face of the second lens, the lens as a whole is adjusted to its maximum equivalent focal length, giving a telephoto effect. When the first and third lenses are in their extreme rear position, with the rear face of the first lens close to the front face of the second lens, the lens as a whole is adjusted to its minimum equivalent focal length, giving a wide-angle effect, with a wider field of view. At an intermediate position of adjustment, the lens is "normal."

The viewfinder of the present invention comprises the same general arrangement, in a simplified and relatively inexpensive form. It has four simple lenses of molded plastic material. The first and third lenses (counting from the front) are positive lenses which are axially movable, and are rigidly coupled to each other for conjoint equal movement. The second and fourth lenses are negative lenses, and are axially stationary. The viewfinder lenses are so designed that for a given change in the size of the field of view of the viewfinder and the field of view of the picture taking lens, the axially movable lenses of the viewfinder are moved in the same direction and to the same extent. Or, stating the same relation in another way, equal axial movements of the movable members of the taking lens and the viewfinder lens will result in equal proportionate changes in the field of view of both lenses. Hence the movable members of the two lenses can be directly and rigidly coupled to each other for conjoint movement, thus eliminating the need for levers, cams, or other arrangements for producing a differential or unequal movement of the movable members of the finder lens as compared with those of the taking lens.

To give a specific example of a suitable viewfinder lens matched to and intended for use with the specific taking lens disclosed in said copending application (Serial No. 786,978), the viewfinder lens may be constructed in accordance with the numerical data given in the following table. In the table, the individual lens elements are numbered consecutively from front to rear. The radii of curvature R, the axial thicknesses T of the lens elements, and the spacings S between elements, are all expressed in the customary manner, with the usual subscripts indicating the particular surface, lens thickness, or air space, numbered in sequence from front to rear. The dimensions are given in millimeters. The plus and minus values of the radii R indicate surfaces respectively convex and concave toward the front. The usual tabular columns giving refractive indices and dispersive indices or Abbe numbers are omitted from the following table, however, because all of the viewfinder lens elements, in this specific example of the invention, are molded from the transparent plastic material known as "Lucite" or "Plexiglas," having a refractive index (expressed with reference to the spectral D line of sodium) in the range of 1.49 to 1.50, and having a dispersive index or Abbe number in the range of 60.0 to 61.0.

The diameters of the respective lens elements are shown in the tabular column headed D. However, these are merely the theoretical diameters. In practice, at least the first lens element (and also the second and third, if desired) has its edges cut away from the theoretical circular outline to a rectangular shape (inscribed within the theoretical circle) corresponding to the rectangular shape of the "frame" of film exposed by the taking lens; in other words, having the same "aspect ratio" as the film frame. Of course the same limitation of the field of view of the viewfinder, to agree with the shape of the format or frame of the film, may be accomplished by leaving the viewfinder lenses of circular outline and using a rectangular mask at the front lens, if desired.

The numerical data of diameters, radii, and thicknesses are as follows:

| Lens | D | Radii | Thicknesses |
|---|---|---|---|
| 1 | 35.0 | $R_1=+64.6$ | $T_1=8.67$ |
|   |      | $R_2=-175.65$ | $S_1=2.35$ to $27.50$ |
| 2 | 20.0 | $R_3=-80.6$ | $T_2=1.5$ |
|   |      | $R_4=+17.85$ | $S_2=28.65-S_1$ |
| 3 | 20.0 | $R_5=+17.4$ | $T_3=4.60$ |
|   |      | $R_6=\infty$ | $S_3=S_1$ |
|   |      | $R_7=\infty$ |  |
| 4 | 10.0 | $R_8=+31.3$ | $T_4=1.0$ |

These numerical data are repeated for convenience in FIG. 2 of the drawing, which constitutes a quick-reference table.

In this specific example, lens 4 is the eyepiece lens of the viewfinder, and the eye of the observer is to be placed in line with lens 4 and as close thereto as reasonably possible.

As already mentioned, lenses 2 and 4 are axially stationary, while lenses 1 and 3 are axially movable and are rigidly coupled to each other to move together through equal amounts. In all positions of adjustment, $S_1+S_2$ is a constant, $S_2+S_3$ is the same constant, and $S_1=S_3$. The constant is 28.65 mm.

When lenses 1 and 3 are shifted to their rearmost or wide angle position, $S_1=2.35$ mm., $S_2=26.30$ mm., $S_3=2.35$ mm., and the viewfinder optical system has a magnification of 0.738×. When lenses 1 and 3 are adjusted to their most forward or telephoto position, $S_1=27.50$ mm., $S_2=1.15$ mm., $S_3=27.50$ mm., and the optical system has a magnification of 2.218×. At a typical intermediate position which may be called the "normal" position (being the position schematically shown in FIG. 1), $S_1=11.00$ mm., $S_2=17.65$ mm., $S_3=11.00$ mm., and the optical system has a magnification of 1.07×.

The present invention relates only to the optical design of the viewfinder. The mechanical mounting thereof and the mechanical connection of the movable parts of the viewfinder to the movable parts of the picture-taking lens constitute a separate invention of another applicant, on which a separate patent application has been or shortly will be filed, identified as Serial No. 845,013, filed October 7, 1959, in the name of Frank C. Lustig.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:
1. A viewfinder lens system adjustable to vary the field of view of the system, comprising four air-spaced lenses of plastic material, the characteristics of the lenses and their spatial relationship to each other being substantially in the proportions indicated by the data in the following table:

| Lens | Radii | Thicknesses |
|---|---|---|
| 1 | $R_1=+64.6$ | $T_1=8.67$ |
|   | $R_2=-175.65$ | $S_1=2.35$ to $27.50$ |
| 2 | $R_3=-80.6$ | $T_2=1.5$ |
|   | $R_4=+17.85$ | $S_2=28.65-S_1$ |
| 3 | $R_5=+17.4$ | $T_3=4.60$ |
|   | $R_6=\infty$ | $S_3=S_1$ |
|   | $R_7=\infty$ | $T_4=1.0$ |
| 4 | $R_8=+31.3$ |  | wherein the lenses are numbered in order from front to rear in the first column, the radii of curvature of the lens surfaces are given in the second column, the respective surfaces being numbered from front to rear and being respectively identified by the subscript numeral used with each R, with plus and minus values of R indicating curved surfaces which are respectively convex and concave toward the front, the axial thicknesses T of the respective lenses and the axial thicknesses S of the air spaces between the lenses being given in the third column, the respective lens element thicknesses and air spaces being separately numbered from front to rear and being respectively identified by numerical subscripts used with each T and S, the lenses 2 and 4 being axially stationary and the lenses 1 and 3 being axially movable in unison to vary the field of view of the system.

2. A construction as defined in claim 1, in which all four of said lenses are molded from plastic material having a refractive index, expressed with reference to the spectral D line of sodium, substantially in the range of 1.49 to 1.50, and have a dispersive index substantially in the range of 60.0 to 61.0.

References Cited in the file of this patent
UNITED STATES PATENTS

| | | |
|---|---|---|
| 2,566,485 | Cuvillier | Sept. 4, 1951 |
| 2,755,701 | Altman | July 24, 1956 |
| 2,925,010 | Turula et al. | Feb. 16, 1960 |